US008952231B1

(12) United States Patent
Gonzalez

(10) Patent No.: US 8,952,231 B1
(45) Date of Patent: Feb. 10, 2015

(54) COMPACT GEARLESS TUNING MECHANISM FOR STRINGED INSTRUMENTS

(75) Inventor: Eduardo Edison Gonzalez, Miami, FL (US)

(73) Assignee: Eduardo Edison Gonzalez, Sunny Isles Beach, FL (US)

( * ) Notice: Subject to any disclaimer, the term of this patent is extended or adjusted under 35 U.S.C. 154(b) by 61 days.

(21) Appl. No.: 13/573,040

(22) Filed: Aug. 15, 2012

Related U.S. Application Data

(63) Continuation-in-part of application No. 12/798,486, filed on Apr. 5, 2010, now abandoned.

(60) Provisional application No. 61/166,294, filed on Apr. 3, 2009.

(51) Int. Cl.
*G10D 3/12* (2006.01)

(52) U.S. Cl.
CPC .......................................... *G01D 3/14* (2013.01)
USPC .......................................................... 84/297 R

(58) Field of Classification Search
CPC .................................... G10D 3/12; G10D 3/14
USPC .......................................................... 84/297 R
See application file for complete search history.

(56) References Cited

U.S. PATENT DOCUMENTS

| | | | | |
|---|---|---|---|---|
| 806,949 | A | 12/1905 | Braun | |
| 2,304,597 | A * | 12/1942 | Proelsdorfer | 84/297 R |
| 3,407,696 | A * | 10/1968 | Smith et al. | 84/297 R |
| 4,004,485 | A | 1/1977 | Hiscott | |
| 4,073,211 | A | 2/1978 | Jorgensen | |
| 4,576,080 | A | 3/1986 | McLellan et al. | |
| 4,608,904 | A | 9/1986 | Steinberger | |
| 4,638,708 | A | 1/1987 | Kamal | |
| 4,770,079 | A | 9/1988 | Mastroianni | |
| 5,233,896 | A | 8/1993 | Worthington et al. | |
| 5,277,095 | A | 1/1994 | Steinberger | |
| 5,285,709 | A * | 2/1994 | Grant | 84/297 R |
| 5,353,672 | A | 10/1994 | Stewart | |
| 5,383,385 | A | 1/1995 | Gilbert | |
| 5,442,986 | A | 8/1995 | Cota | |
| 5,522,299 | A * | 6/1996 | Rose | 84/314 N |
| 5,589,653 | A * | 12/1996 | Rose | 84/314 N |
| 5,814,746 | A | 9/1998 | Stafford | |
| 5,949,005 | A | 9/1999 | Peterson | |
| 6,025,548 | A | 2/2000 | Ehrlich | |
| 6,028,255 | A | 2/2000 | Myronyk | |
| 6,972,360 | B1 | 12/2005 | Ekin | |
| 7,375,267 | B2 | 5/2008 | Poschelk | |
| 7,470,841 | B1 | 12/2008 | McCabe | |

* cited by examiner

*Primary Examiner* — Robert W Horn

(57) ABSTRACT

A tuning mechanism for a stringed instrument consists of a plurality of levers, one for each string, each lever having a pivoting point at one end, and a tuning screw at the opposite end with its tip pressing against a structural point of the instrument. The tension of the string is applied on the central portion of the lever. Each lever has a rotatable capstan to which the string is anchored and winded until it acquires tension as a sort of coarse tuning. A locking device prevents the capstan to turn backwards and the tuning screw is used for fine tuning. The levers can be placed parallel to each other and receive the strings in a compact arrangement that makes possible their placement as a block behind the nut, with a sizable reduction of length and bulk of the instrument by the virtual elimination of the peg head.

9 Claims, 7 Drawing Sheets

FIG. 3
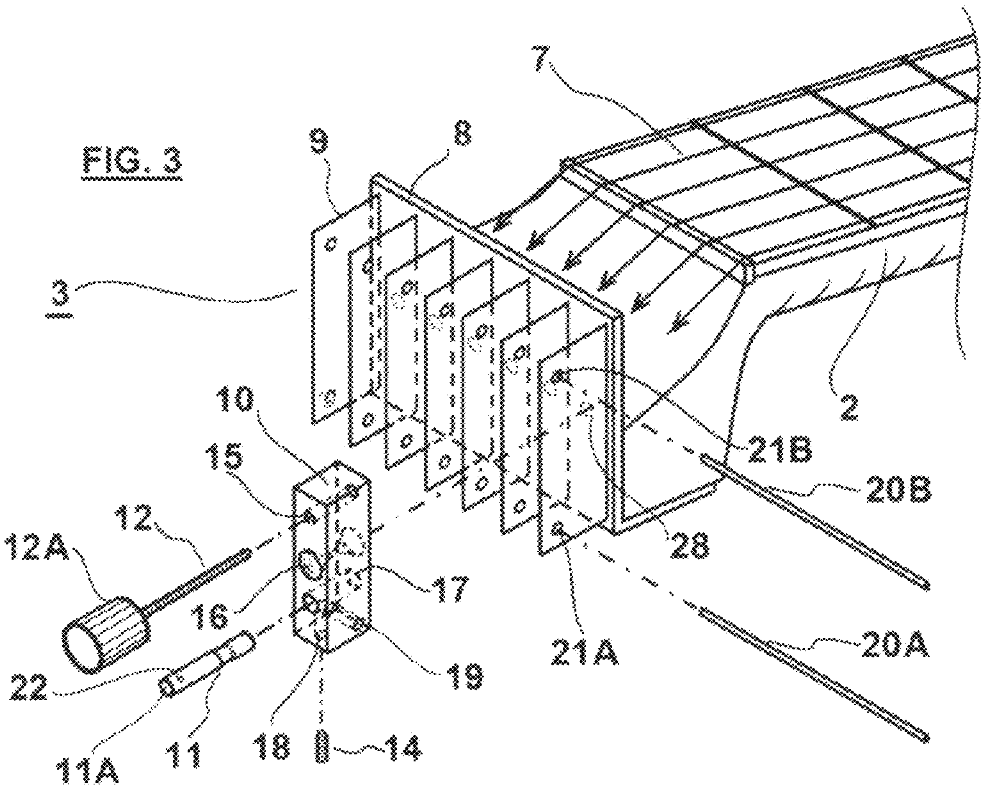
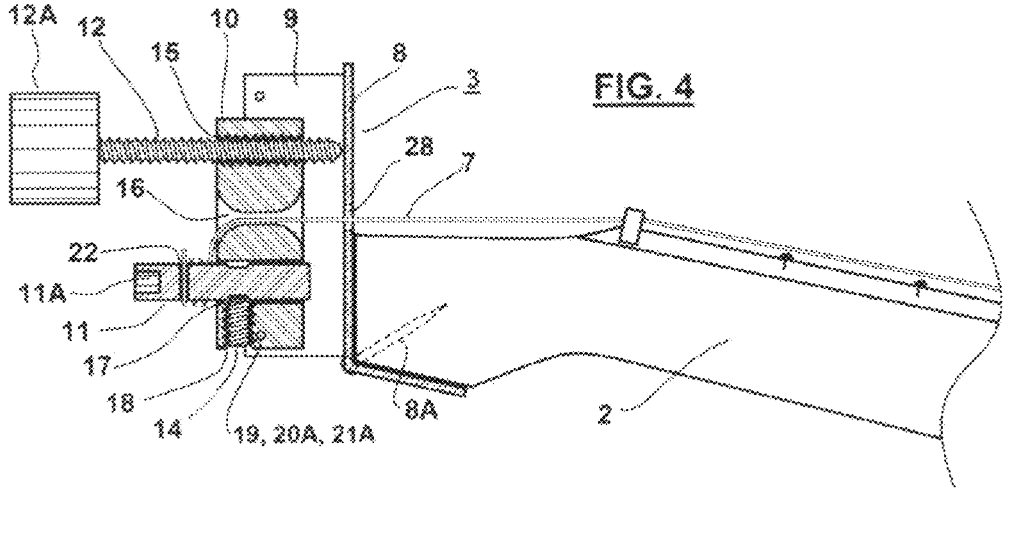
FIG. 4

COMPACT GEARLESS TUNING MECHANISM FOR STRINGED INSTRUMENTS

CROSS-REFERENCE TO RELATED APPLICATIONS

This application is a Continuation In Part of application Ser. No. 12/798,486.

This application claims the benefit Patent Application Ser. No. 61/166,294 filed on Apr. 3, 2009 by the present inventor.

BACKGROUND

Previous Art

The most widely used mechanisms for tuning stringed instruments are machine heads. A single machine head consists of a cylinder or capstan, linked to a knob or button through a pinion and worm gears mechanism. The capstan has a hole through the far end from the gear, the string is made to go through that hole, and is wrapped around the capstan. The string is tightened by turning the capstan using the tuning knob. The machine heads, one per string, are normally mounted on the peg head, which is an extension of the neck of the instrument and can have a variety of shapes.

Machine heads have disadvantages. One is that the tuning process is somewhat made difficult by the change in pitch not being linear when the direction of the pitch change is reversed from low-to-high to high-to-low. This due to the play between the gears and the friction forces of the mechanism. This makes it hard to control the pitch when it has to be slightly lowered, making necessary to tune always from low to high pitch to have enough precision and tuning stability, which limits the tuning accuracy, since often players will rather accept a slight tuning error than having to restart the process.

Another disadvantage of machine heads is that the peg head adds to the length and bulk of the instrument. One way to eliminate this bulk is to mount the machine heads behind the bridge on the body of the guitar, but this makes the tuning process awkward because the player has to turn the buttons with the opposite hand to which he is used to, and it prevents the use of some accessories like a tremolo bar and in some cases a regular pick guard and/or multiple pickups.

There are other mechanism which tension the string by turning a screw that has a knob and is threadly linked to a piece having the string attached to it, so the string is tensioned by the linear movement of said piece as the screw is turned using the knob. An example of this mechanism is used in Portuguese Guitars. A variant of this mechanism has the string attached to the screw, which is prevented to turn but can move in the direction of its axis, said screw threading into a rotatable piece having a female thread and a knob and being prevented from moving except for its rotation. The string is tensioned by the displacement of the screw produced by the rotation of the knob. An example of this mechanism is Steinberger U.S. Pat. No. 5,277,095

These tuning screw systems solve the non linearity problem since the threaded pieces are always pressed in the same direction and other friction forces are minimal. Also they are less bulky than peg heads, but present the inconvenience of having a limited tuning range or a range which is difficult to modify, or requiring the use of special strings having anchoring rings, balls or loops at both ends which are hard to find in music stores. They also limit the amount that the string can be stretched, making necessary the replacement of the string if it stretches beyond the range of the movement of the threaded piece to which it is anchored.

SUMMARY OF THE INVENTION

The present invention overcomes the problems presented by machine heads and tuning screw systems by combining some elements of both in a compact arrangement which virtually eliminates the peg head allowing the smooth bidirectional operation of a screw system for fine tuning and the use of regular strings winded around a rotatable capstan, extending the tuning range. This is accomplished by the use of a lever with its pivoting point close to one of its ends having a rotatable cylinder or capstan mounted on it to which the string is attached by winding it as in a machine head.

Locking means are provided preventing the capstan from turning backwards when the string is under tension. The lever has an opening close to its end opposite to its pivoting point in which a tuning screw is threadly mounted. The tuning screw has means to turn it at one end while its opposite end pushes against a structural point of the instrument, counteracting the tension of the string which goes through the body of the lever and applies its tension in a direction essentially parallel to the tuning screw, so the string is stretched when the tuning screw is turned.

Turning the capstan until the string is under tension provides coarse tuning, while the tuning screw provides the fine tuning. If the tuning screw gets to the end of its range, it is turned all the way backwards loosening the string, and then the capstan is unlocked, turned to tension the string, and locked again, after which the string can be fine tuned using the tuning screw.

In the described embodiments the six tuners can be easily removed from the neck as a block, making this invention particularly suitable for instruments that are collapsible and can be disassembled or folded for travel.

DESCRIPTION OF THE DRAWINGS

FIG. 3 is the exploded isometric view of the tuner mechanism for one of six devices according to the first embodiment.

FIG. 4 is a cross section of the tuner of the first embodiment.

DESCRIPTION OF THE PARTS BY NUMBER

Figure 1:
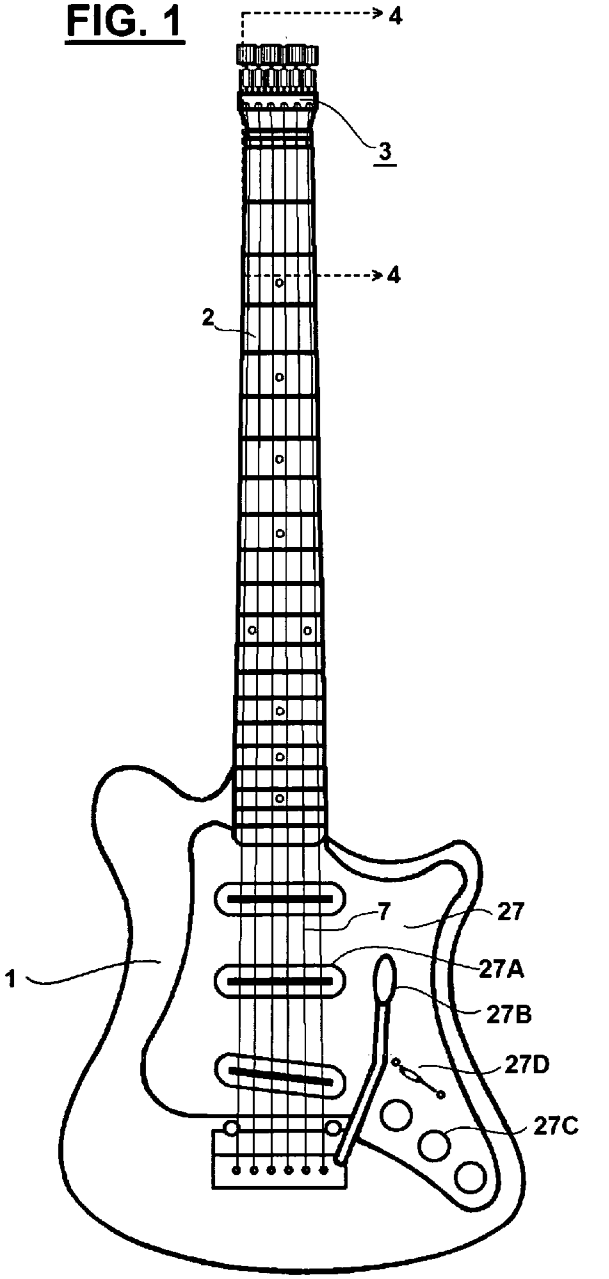
FIG. 1 is the frontal view of the guitar showing the tuning block with a view of the tuning knobs in the second embodiment.

1—Body of the guitar
2.—Neck of the guitar

3.—Tuner block
7.—Any one of the strings
8.—Base plate of the tuner block
9.—Any one of the plates perpendicular to the Base Plate that hold the tuner bodies
10.—Any one of the tuner bodies
11.—Capstan where the string is anchored
11A.—Socket (or bolt head) to turn capstan 11
11C—End of capstan 11 machined to be turned with multiple tools.
12.—Tuning Screw
12A.—Tuning Knob
12B.—Tuning screw with cone point
12C.—Tuning screw with socket (or head) for driver tool
13.—Resting cavity for pivoting tuner screw
14.—Capstan set screw
15.—Threaded hole for the tuning screw on tuner body 10
15B.—Threaded hole on pivot for tuning screw on second embodiment
16.—Horn shaped hole through which the string crosses the tuner's body
17.—Capstan receptacle hole
18.—Capstan set screw threaded hole
19.—Hole to insert the pivot of the tuner's body
20A.—Pivoting pin common to the tuners mounted straight
20B.—Pivoting pin common to the tuners mounted upside down
21A, 21B.—Passing holes on plates 9 to hold pins 20A, 20B
22.—String threading hole on capstan 11
24.—Pivot for tuning screw on second embodiment
25.—Hole to insert pivot 24 on second embodiment
26.—Holding extensions to hold pivot 24 on second embodiment
28.—Holes where the strings cross the base plate 8
30.—Gear of ratchet mechanism
30B.—Machined indentation (one of several) on capstan shaft
30C.—Tooth (one of several) on capstan shaft formed by machining.
31.—Pawl of ratchet mechanism
32.—Pawl pivoting pin
32A.—Hole on pawl for its pivoting pin
32B.—Hole for locking pin
32C.—Locking pin
33.—Hole on tuner body to receive pawl pivoting pin
34.—Holding pin for loading spring
34A.—Hole for holding pin 34
34B.—Holding pin for loading spring
35.—Pawl loading spring
35A.—Locking pin loading spring
36.—Hole on tuner body to receive opposite end of spring
37.—Hole on pawl to receive loading end of spring
38.—Retaining grove on capstan
39.—Hole on tuner body to receive capstan retaining pin
40.—Capstan retaining pin
41.—Female thread on capstan end
42.—Headless set screw

DETAILED DESCRIPTION

The following description refers to the invention applied on a guitar, but it is applicable to other stringed instruments and it can be installed as a block or individually in any position or configuration that is practical to operate, and it can use any type of knob or driver to perform the tuning process, as well as a variety of mechanisms to lock the capstan.

FIG. 1 illustrates an electric guitar comprising a body 1, a neck 2 and a tuner block 3 and a plurality of strings 7, showing how the reduced dimensions of the tuner block 3 render the guitar almost headless, reducing the bulk of the instrument.

First Embodiment of the Tuner Mechanism

FIG. 3 is an exploded isometric view of the first embodiment of the tuner mechanism showing one of the six devices used on a guitar as it relates to the other components, and it is complemented by FIG. 4 which is a cross section of one of the tuners.

The center piece of the mechanism is the tuner body 10, which works as a class 2 lever, with the pivoting point at its hole 19 crossed by pin 20A, which rests against holes 21A on plates 9 which transmit the forces to plate 8.

String 7 goes through hole 28 on plate 8 and then crosses through the tuner body 10 at its hole 16 which has rounded edges. From hole 16 the string threads into hole 22 on capstan 11 and it is winded around it by turning capstan 11 using a driver that fits its socket (or head) 11A. Since the most significant force securing the string to the capstan is the friction created by the winding, the string can also be secured to the capstan by the friction force only without crossing it through a hole, or instead of a hole it can go through a slot or a cut on capstan 11.

Capstan 11 is turned by applying a tensioning torque on its socket head 11A with the proper driver tool until string 7 acquires enough tension (just below its normal pitch) and then it is locked using set screw 14 which fits hole 18 on tuner body 10 and pushes on capstan 11 sideways, preventing it from turning backwards under the torque exerted by the string.

Capstan 11 may have flattened sides at its point of contact with set screw 14 to improve the locking effect of set screw 14. Although a socket head is assumed to apply the tensioning torque on 11A, capstan 11 can use any type of head and driver tool able to apply the proper torque.

The tension of the string is now counteracted by the pivot point of tuner body 10 at hole 19 crossed by pin 20A and by the force acting on tuner body 10 through tuning screw 12 which works as the working force of a class 2 lever in which the load (the string tension) is applied between the pivoting point and the working force. Hence, the turning of tuning screw 12 will make the lever pivot around pin 20A and move the "free" end of the string, and as a result change its tension, thus allowing precise tuning of the string within the range of motion of tuner body 10 when turning screw 12 with its knob (or button).

The pitch range can be modified by tightening or loosening the initial tension on the string exerted by capstan 11, providing a virtually unlimited range of tuning.

Alternated Orientation of the Tuners

The distance between the tuner mechanisms is quite small, so there is not enough room to use knobs on tuner screws 12 if all the knobs were on the same row. This problem has been solved by alternating the position of the tuners in opposite directions so that instead of having six knobs in a row, there are two rows of three knobs each in alternate positions in a zig-zag configuration, with increased distance between each knob, providing enough room between the knobs to insert the fingers, the knobs being of such a diameter as to be comfortable to operate. Hole rows 21B and pin 20B provide the pivoting points for the tuners installed upside down.

In the embodiment of FIG. 3 and FIG. 4 the tip of the tuning screw 12 pushing on plate 8 will move on the surface of plate 8 as the tuning screw is turned because of the rotation of tuner body 10 around its pivoting point, the angle between tuner body 10 and tuning screw 12 being fixed. This does not affect the precision of the tuning process, but it does change the angle of screw 12A in reference to the guitar's neck and the tuners of the other strings, limiting the practical range of the fine tuning screw.

Second Embodiment of the Tuner

Figure 5:
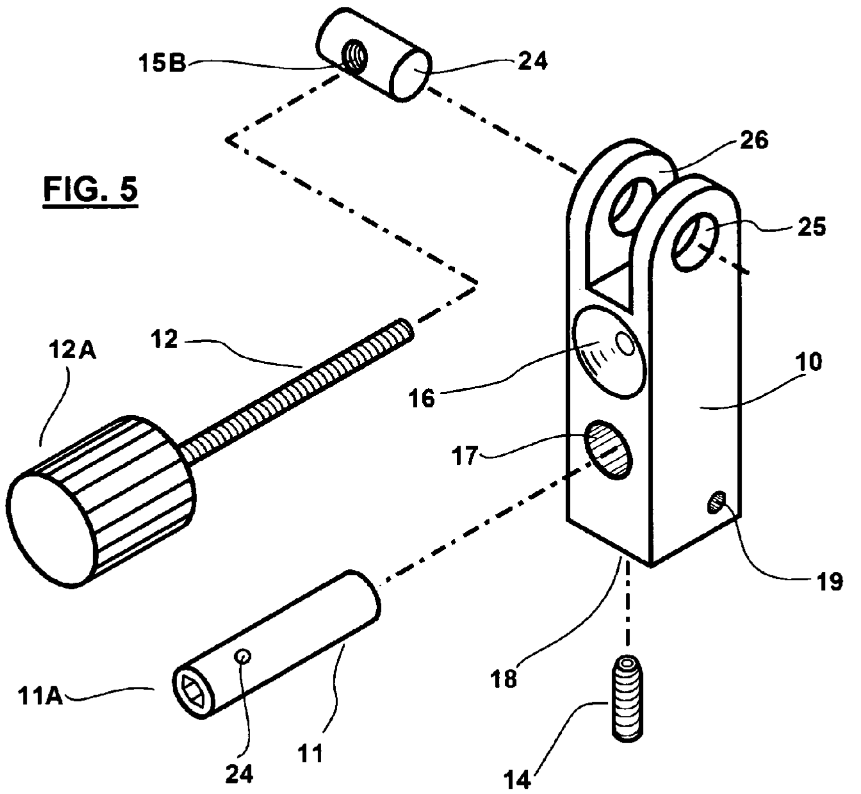
FIG. 5 is an exploded isometric view of a second embodiment in which the tuning screw is pivotally mounted.
Figure 6:
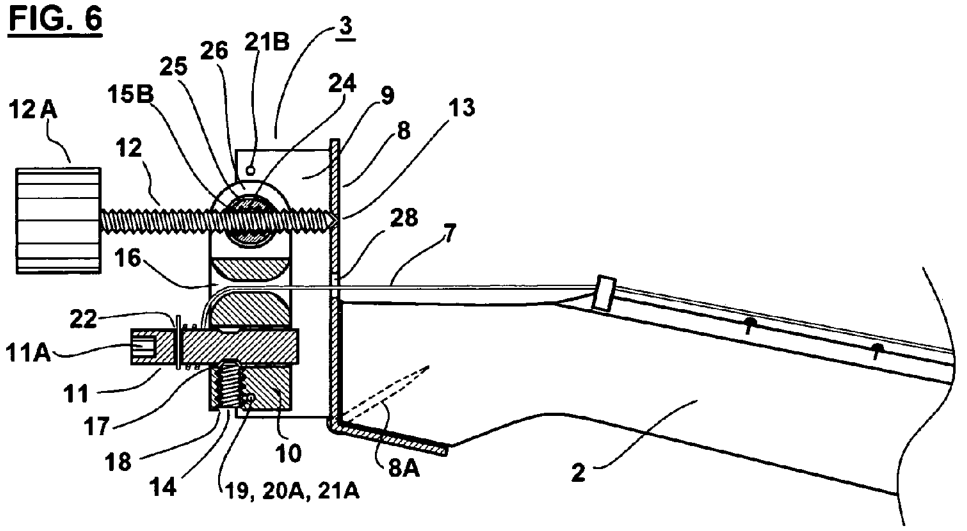
FIG. 6 is a cross-section of the second embodiment.

FIG. 5 is an exploded isometric view of an embodiment in which the tuning screw can pivot on body 10 so that the position of its tip on plate 8 can remain the same through the tuning range and the angle it forms with base plate 8 essentially unchanged. FIG. 6 is a cross-section of the tuner of this embodiment.

Pivot 24 is inserted into holes 25 on body 10. Screw 12 threads into threaded hole 15B on pivot 24, and its cone tip fits cone cavity 13 on plate 8, where it exerts the working force of the lever on plate 8. The applied force is transmitted to body 10 through pivot 24 and extensions 26 on body 10, which is machined to allow enough pivoting range to tuning screw 12.

Under string tension the tip of the tuning screw 12 will remain in cavity 13, with the effect that the swing motion of screw 12 will be unnoticeable and it will not interfere with the other tuners over a wider tuning range.

Third Embodiment of the Tuner

Figure 7:
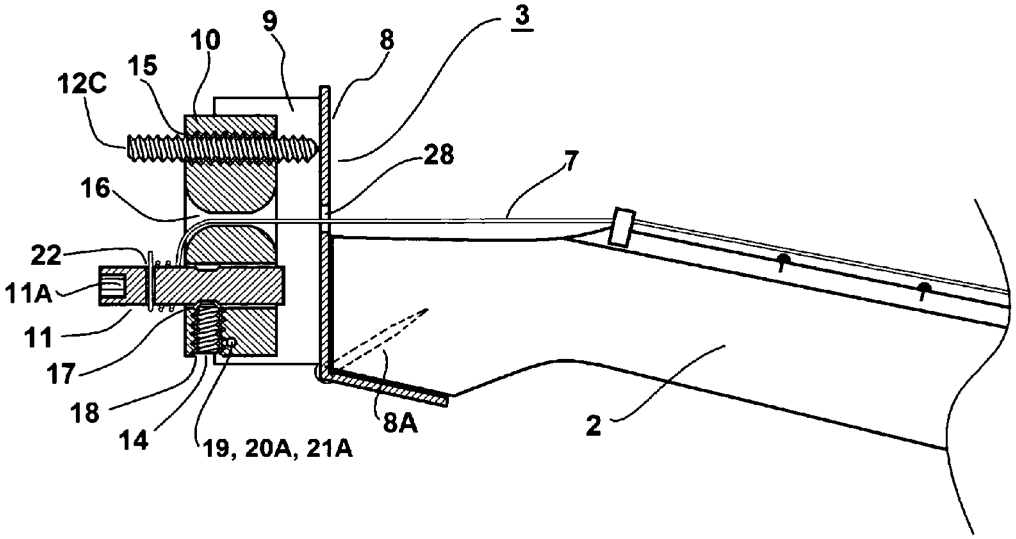
FIG. 7 is a cross-section of a third embodiment in which the tuning screw is turned with a driver tool.

FIG. 7 is a cross section of an embodiment of the tuner in which no knob is used, reducing the bulk even further. Tuning screw 12C threads directly into threaded hole 15 on body 10, and tuning is achieved by turning screw 12C with a driver that fits its socket (or head).

Since there is no need to alternate the orientation of the tuners, the upper holes 21B on plates 9 can be omitted and the height of the tuner block reduced. Although tuning screw 12C requires a tool to be operated, the accuracy of the tuning is improved by the better grip and torque provided by a driver tool compared to a knob. Although a socket headless screw is used in the drawings, the tuning screw can use any type of head and driver tool.

Fourth Embodiment of the Tuner

Figure 2:
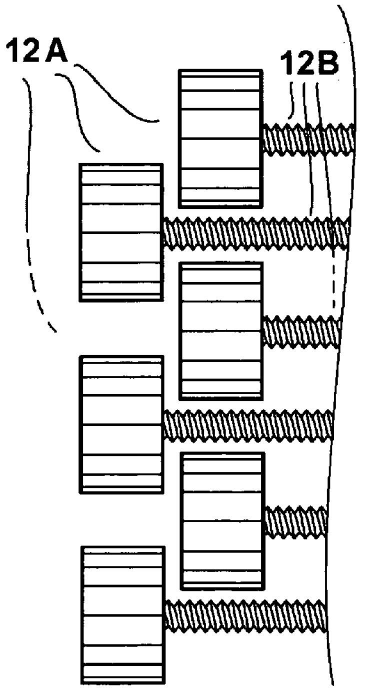
FIG. 2 is the top view of the alternate position of the tuning knobs in the 4th embodiment.
Figure 8:
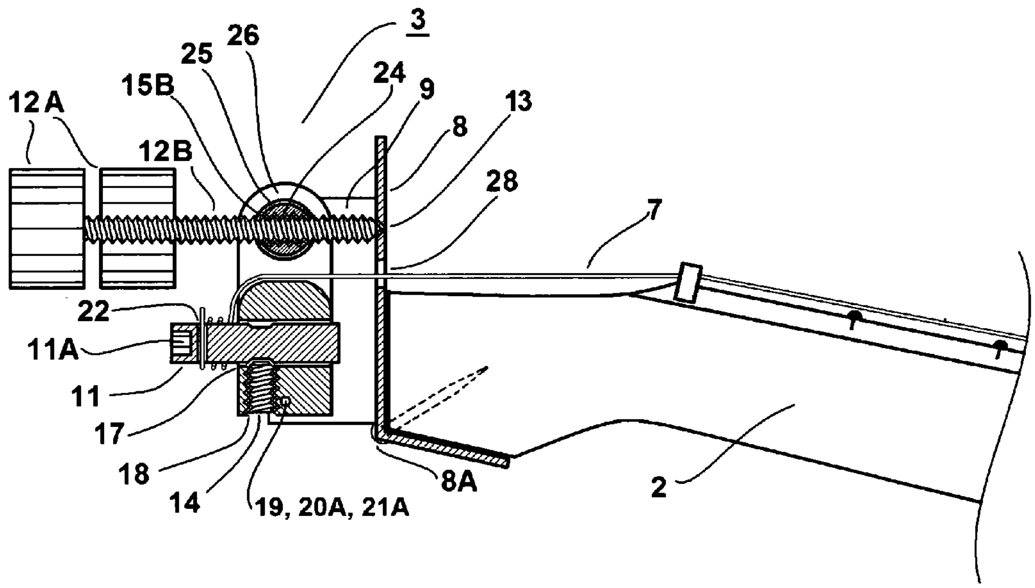
FIG. 8 is a fourth embodiment in which the tuning knobs are placed alternated in an horizontal plane.

FIG. 8 is a cross section of an embodiment in which the knobs are placed in alternate positions on an horizontal plane by alternating "long" and "short" tuning screws, allowing the use of knobs that fit between the screws as shown in FIG. 2, eliminating the need to use tools for tuning or to alternate tuners in upside down and straight position, which renders passing holes 16 unnecessary since the string does not need to cross body 10 close to its center, allowing the string to cross tuner body 10 through the opening between holding extensions 26, whose edges are rounded to protect the string.

Fifth Embodiment of the Tuner

Figure 9:
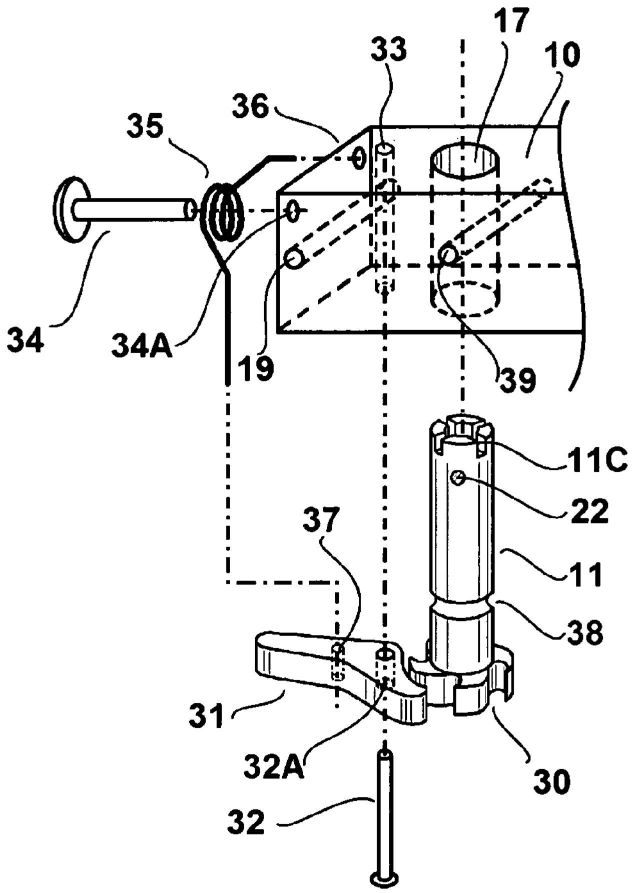
FIG. 9 is an exploded isometric view of a fifth embodiment in which the capstan locking mechanism is a ratchet device.

FIG. 9 is an isometric exploded view of an embodiment that uses a ratchet mechanism to lock capstan 11. This renders the coarse tuning much easier since there is no need to loosen and tighten the set screw, is suffices to turn capstan 11 in the proper sense and it will stay locked by the ratchet mechanism. Capstan 11 enters hole 17 and is held in place by a pin (not shown) on hole 39 engaging groove 38 on capstan 11. Pawl 31 pivots on pressure pin (or screw) 32 which crosses pawl hole 32A and is inserted in (or threaded into) hole 33 of body 10, pivotally connecting pawl 31 to body 10. The lower end of spring 35 enters hole 37 spring-loading pawl 31 to engage gear 30. Spring 35 is held in place by pin (or screw) 34 which enters hole 34A (shown only in outline) in body 10 and its upper end has a bent which enters hole 36 (shown only in outline) on body 10 providing angular locking. Pawl 31 has an extended arm that protrudes to the back of body 10 to allow the manual release of the ratchet mechanism to remove the string or reduce its tension.

Instead of a socket or screw head for turning capstan 11, it has an opening and two slots at its end 11C, allowing the use of a variety of drivers to turn it, including flat and philips screw drivers, any flat shaped object and even paper clips, rendering its operation less dependent on the availability of any particular tool.

Sixth Embodiment of the Tuner

Figure 10:
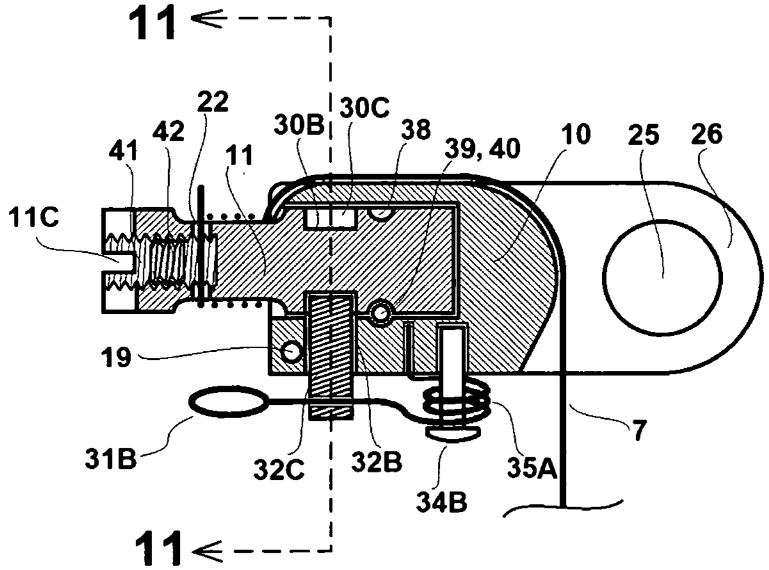
FIG. 10 is a cross section of a sixth embodiment in which the capstan is placed in the same direction of the tuner body and a ratchet device is created by machined indentations on the capstan's shaft and a spring loaded locking pin.

FIG. 10 is a cross section of an embodiment in which capstan 11 is mounted parallel to lever 10 and uses a ratchet mechanism created by machining several indentations 30B on the shaft of capstan 11, which produces the same number of teeth 30C in such a way that a pin 32C sliding in opening 32B plays the role of the pawl of the ratchet. Pin 32C is loaded by spring 35A which is held in place by pin (or screw) 34A and locked in position by its far end entering a hole in body 10. The ratchet is released by pushing downwards on ring 31B, which disengages pin 32C.

Figure 11:
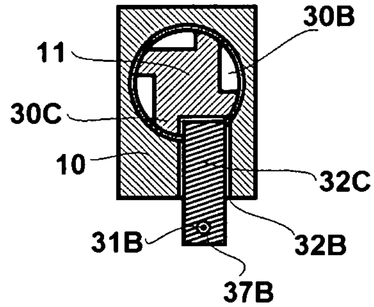
FIG. 11 is cross section view 11-11 of FIG. 10, showing the teeth forming the gear of the ratchet.

FIG. 11 is cross section view 11-11 of FIG. 10, showing the teeth forming the gear of the ratchet. Their asymmetrical shape as well as the off-center position of pin 32C has the effect of locking capstan 11 without pushing pin 32C outwards, since the force exerted by the tooth 30C in contact with it is perpendicular to its surface at the point of contact, hence perpendicular to the axis of pin 32C. Also Pin 32C is not subjected to any torque, since the force from tooth 30C is transmitted directly to the wall of hole 32B. In this embodiment the string 7 loops around body 10 and is wound around capstan 11 after crossing hole 22. Body 10 had rounded edges where the string is bent. Capstan 11 has a coaxial hole at its end 11C and perpendicular slots cut into it to allow the use of a variety of driver tools as in the fifth embodiment.

String Locking Device

When installing a new string, the string is passed through its path which normally begins at the bridge and ends with the crossing of hole 22 on capstan 11, after which the string is wound by turning the capstan. A certain excess length must be left on the string to be wound around the capstan and it is important that such length be within certain limits to avoid the string under tension from sliding out of hole 22 if there are not enough turns, or a build up of overlapped string turns if there are too many turns.

The additional length for winding is difficult to control since the string tends to slide freely inside hole 22 when it is loose. For this reason a sizable length of string is normally left after crossing hole 22 and the capstan is turned with that excess length hanging out of hole 22. All these inconveniences can be avoided if the string can be firmly locked in hole 22 and cut as close as possible to the capstan before winding it. For this purpose the hole at the tip 11C of capstan 11 is provided with a female thread 42 and is made to cross hole 22. Headless set screw 42 is threaded into to allow the locking of the string 7 as it crosses capstan 11 through hole 22.

Screw 42 can be of any driver type like hex socket, slot, or any other headless driver type available. It can be left permanently tightened to improve the holding of the string at the capstan if the availability of the driver tool is assured.

Other Embodiments

The specific embodiments of the invention that have been shown and described in detail do not bar the possibility of embodiments that combine elements of the embodiments described above or other embodiments and variations that will not depart from the principles of this invention. For instance, the gears of the ratchet devices described use four teeth, but a different number of teeth can be used.

What is claimed:

1. A tuning mechanism for a stringed instrument which comprises for each string:

a lever, pivotally mounted on a structural point of the instrument in a position essentially perpendicular to the direction of the string, having its pivoting point close to one of its ends, having a first opening in its body to allow the string to cross through it; a second opening to receive a rotatable capstan; means to lock said shaft or capstan rotation; and a threaded bore close its other end to receive a tuning screw in a direction essentially parallel to the string;

a rotatable capstan inserted in the second opening of the lever having means to receive a torque and means to lock its rotation, to which the string is secured by winding it around the capstan as it is rotated to bring the string under tension, achieving a preliminary or coarse tuning as it rotation is locked;

a tuning screw, mounted on the threaded bore of the lever pushing against a second structural point of the instrument in a direction essentially parallel to the string in such a way as to counteract the pull of the string, said tuning screw provided with means to turn it to achieve the fine tuning of the string.

2. A tuning mechanism as in claim 1 in which the threaded bore to receive the tuning screw is made on a separate piece which is pivotally linked to the lever.

3. A tuning mechanism as in claim 1 or 2 in which the means to rotate the tuning screw is a knob or button and contiguous tuners are mounted in opposite directions to create space to operate the knobs or buttons.

4. A tuning mechanism as in claim 1 in which the tuning screw has a socket or head to be turned with a driver tool.

5. A tuning mechanism as in claim 1 or 2 in which the means to rotate the tuning screw is a knob or button and the tuning screws in contiguous tuners are of different length to position the knobs or buttons in two rows with all the tuners having the same orientation.

6. A tuning mechanism as in claim 5 in which the capstan is mounted parallel to the lever.

7. A tuning mechanism as in claim 6 in which the rotation of the capstan is locked by a ratchet device.

8. A tuning mechanism as in claim 7 in which the string can be locked inside the hole where it crosses the capstan by a screw threading into a female thread coaxial to the capstan which crosses the string hole.

9. A tuning mechanism as in claim 8 in which the capstan has a coaxial hole at the end where the tensioning torque is applied and two perpendicular slots to allow the torque to be applied by a variety of driver tools.

* * * * *